United States Patent [19]
Diffin et al.

[11] Patent Number: 5,917,622
[45] Date of Patent: Jun. 29, 1999

[54] LIGHT DEVICE WITH HOLOGRAPHIC OPTICS

[75] Inventors: Bernard Diffin; Lon A. Demink, both of Kalamazoo, Mich.

[73] Assignee: deMco Technologies, Inc., Kalamazoo, Mich.

[21] Appl. No.: 08/795,520

[22] Filed: Feb. 5, 1997

Related U.S. Application Data

[60] Provisional application No. 60/011,342, Feb. 8, 1996, abandoned.

[51] Int. Cl.[6] .................................................. G02B 5/32
[52] U.S. Cl. .............................. 359/15; 359/20; 362/263
[58] Field of Search ................................ 359/15, 16, 19, 359/20; 362/61, 80.1, 263

[56] References Cited

U.S. PATENT DOCUMENTS

| | | | |
|---|---|---|---|
| 3,641,487 | 2/1972 | Rogers et al. | 340/46 |
| 3,834,786 | 9/1974 | Carlsen | 359/31 |
| 4,428,647 | 1/1984 | Sprague et al. | 359/20 |
| 4,584,501 | 4/1986 | Cocks et al. | 313/493 |
| 4,588,664 | 5/1986 | Fielding et al. | 430/1 |
| 4,857,920 | 8/1989 | Kataoka et al. | 340/907 |
| 4,966,426 | 10/1990 | Moss et al. | 359/15 |
| 4,978,183 | 12/1990 | Vick | 359/15 |
| 5,010,336 | 4/1991 | Mosele et al. | 340/907 |
| 5,347,435 | 9/1994 | Smith et al. | 359/15 |
| 5,422,746 | 6/1995 | Aharoni et al. | 359/16 |
| 5,455,692 | 10/1995 | Wreede | 359/20 |

*Primary Examiner*—Jon Henry
*Attorney, Agent, or Firm*—Flynn, Thiel, Boutell & Tanis, P.C.

[57] ABSTRACT

A device for providing illumination to a specifically defined region including in combination an extended and diffuse light source and a holographic optical element mounted in spaced relation to said light source, said holographic optical element comprising a layer of holograph adaptable material having formed thereon an array of independent holographic lenses each responsive to selected regions on said light source for directing light collected from said selected regions on said light source to a selected viewing pattern.

23 Claims, 4 Drawing Sheets

REDIRECTION OF DIFFUSE LIGHT SOURCE USING HOE

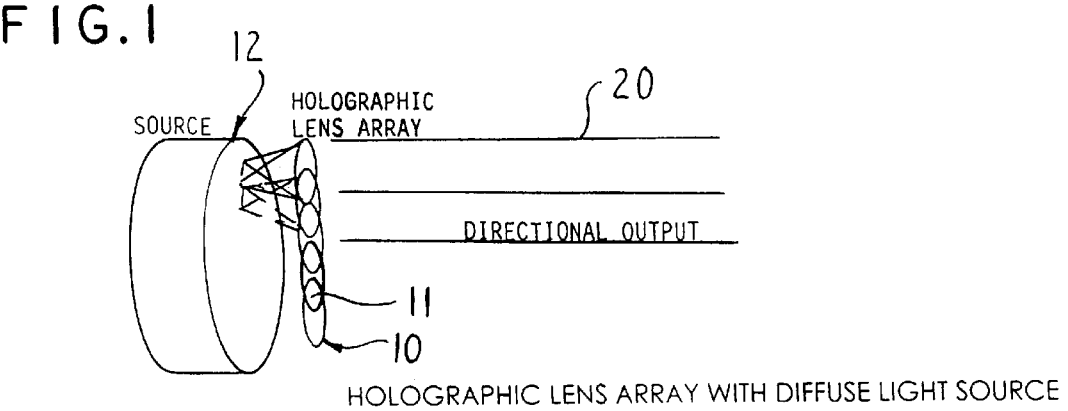
FIG. 1
HOLOGRAPHIC LENS ARRAY WITH DIFFUSE LIGHT SOURCE
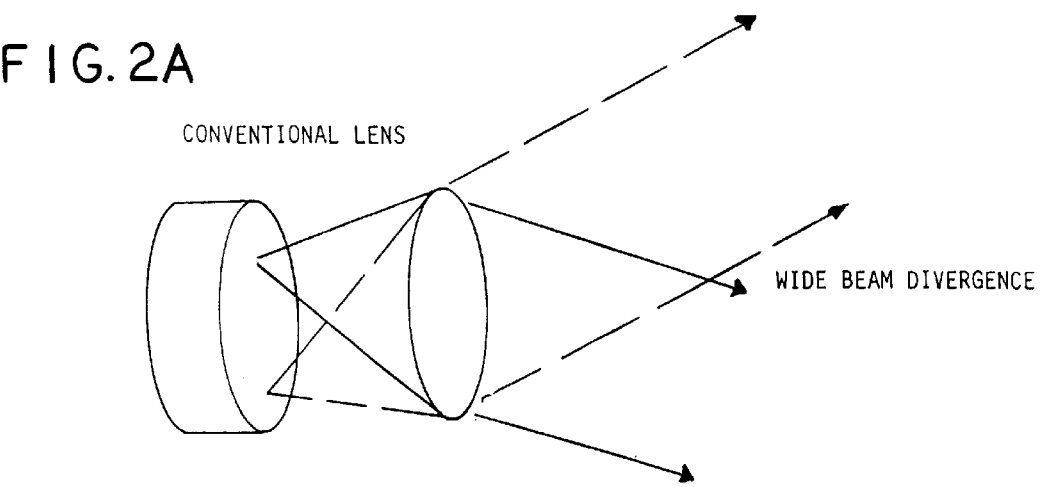
FIG. 2A
FIG. 2B
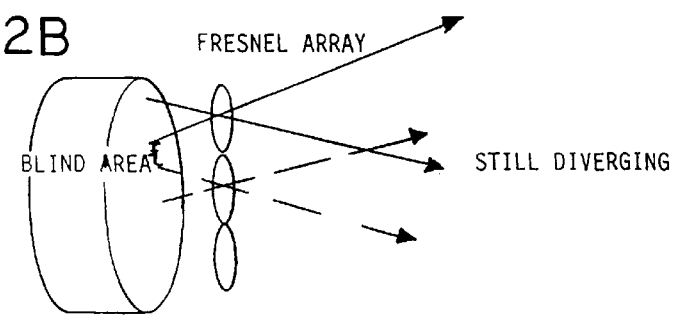
CONVENTIONAL TYPE LENSES CANNOT DIRECTIONALIZE DIFFUSE SOURCES

REDIRECTION OF DIFFUSE LIGHT SOURCE USING HOE

POSSIBLE MODE OF CONSTRUCTION OF HOE LENS FOR USE WITH TRAFFIC SIGNAL

LENSES ARE 1", F1. PLATE IS SYMMETRIC. LIGHT IS COLLECTED AND TURNED 85 DEGREES AS IT LEAVES THE LENS

LIGHT DEVICE WITH HOLOGRAPHIC OPTICS

This application is a continuation-in-part of U.S. Provisional Ser. No. 60/011,342, filed Feb. 8, 1996, now abandoned.

FIELD OF THE INVENTION

This invention relates to a non-point, diffuse light source which is combined with a holographic optical element (HOE) such that the HOE collects a substantial portion of the light from the source and redirects the light to a specific region in space and, more particularly, to a light fixture supporting a HOE for focusing light from the non-point, diffuse light source on infinity.

BACKGROUND OF THE INVENTION

The general field of holographic lenses has been in existence for a number of years. A hologram is a recording of the interference between two coherent beams of light. These beams are referred to as the reference beam and the subject beam. When this recording is reilluminated by the reference beam, the hologram reconstructs the subject beam as though the subject was still present. This means that if the subject was a solid object like a coffee cup, the viewer can look through the hologram (much like looking through a window) and see the coffee cup in three dimensions, without the coffee cup actually being present.

When the subject beam is not reflected from some part, but rather is a spherically expanding or contracting light beam, then the hologram will act as a lens, redirecting the reference beam light from its path to that originally taken by the subject beam in the holographic recording. The predominate use of such holographic optical elements (herein referred to as HOEs) has been to direct the scan of a laser beam (for use in bar code scanning), and to redirect the image of a heads-up display (used, for example, in military aircraft). In each of these cases, the HOE is being used to replace a more complicated linear set of lenses for the benefit of using only one element, and as in the case of bar code scanners, greatly reducing the cost of a system to form a complicated scan pattern.

In recent years, researchers such as H. Kogelnik of Bell Systems and J. Goodman of Stanford University have shown that special holographic optical elements can be used to provide a high degree of correction for use with diode lasers helping to create a better focus. In this work, it is pointed out that HOEs typically suffer from high chromatic aberration, making them impractical for several general applications. Multi-element HOEs, as well as HOEs in use with refractive lenses have shown to be useful over a limited wavelength range.

Other applications of HOEs has included: Fourier transform lenses, holographic encoders, laser range finders, solar concentrators, telocentric optics, fiber optic couplers, infrared lenses, and optical processors. Each of these systems work as a linear lens system collecting light from a well behaved, directional light source, typically laser, and redirecting the light.

Accordingly, it is an object of this invention to utilize in combination a non-point or extended and diffuse light source and a holographic optical element (HOE) for purposes of redirecting the light from the source along an axis to infinity and a specific viewing pattern positioned along the axis of the redirected light.

It is a further object of the invention to provide the combination, as aforesaid, in a traffic light.

It is a further object of the invention to provide the combination, as aforesaid, to create a task light without the requirement of a spaced reflector oriented on a side of the light source remote from the HOE.

It is a further object of the invention to provide the combination, as aforesaid, in an overhead room and/or area lighting fixture.

It is a further object of the invention to provide the combination, as aforesaid, in a vehicular interior and/or exterior light.

SUMMARY OF THE INVENTION

In general, the objects and purposes have been met by providing a light fixture for providing illumination to a specifically defined region, comprising a light fixture housing for supporting an extended and diffuse light source and a holographic optical element oriented in spaced relation to said light source, said holographic optical element comprising a layer of holograph adaptable material having formed thereon an array of independent holographic lenses each being directly responsive (i.e., without the use of bulk optics) to selected regions on said light source for directing light collected from said selected regions on said light source to a selected viewing pattern.

BRIEF DESCRIPTION OF THE DRAWINGS

Other objects and purposes of the invention will become apparent based on the text herein and the accompanying drawings, in which:

FIG. 1 is a schematic diagram illustrating the essential feature of the invention;

FIGS. 2A and 2B schematically illustrate the principle of conventional type lenses not being able to directionalize diffuse light sources;

DETAILED DESCRIPTION

Figure 3:
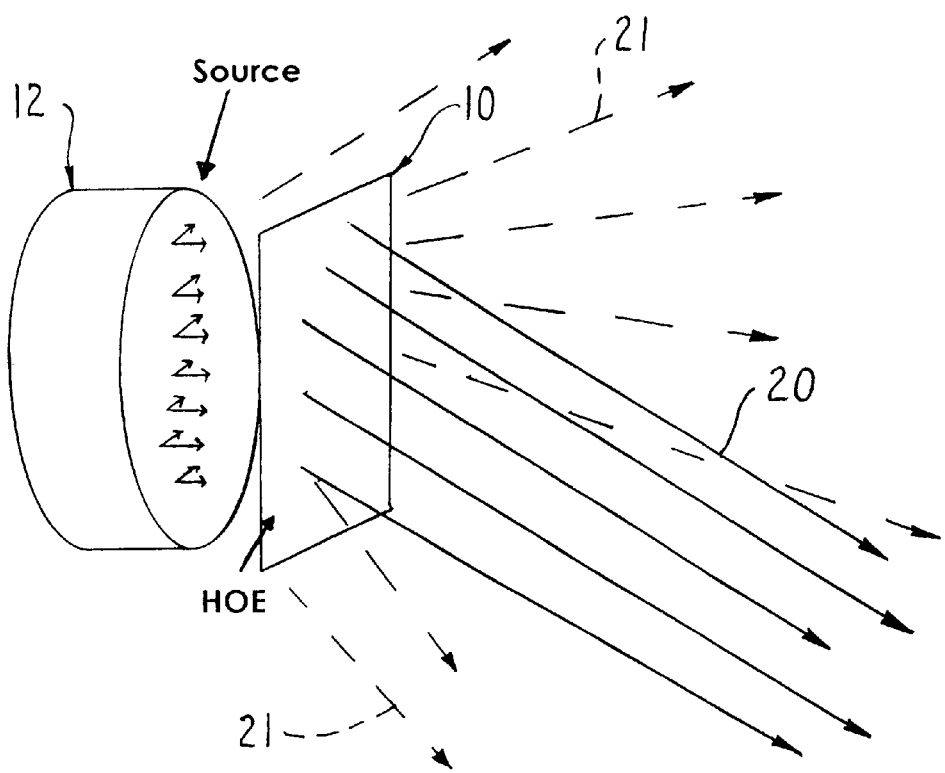
FIG. 3 is a schematic diagram illustrating the redirection of diffuse light using a holographic optical element (HOE)

The HOE 10 of this invention is such that it acts as a series of very low f-number lens elements 11, such as f1, which overlap in space without disrupting the performance of the adjacent lens elements. Each lens element 11 collects light over a specific region of a light source 12, said collection pattern and light source configuration being made to approximately coincide such that each area of the light emitting area of the source is covered by a holographic lens element (HOE) 10. Each lens element 11 of the HOE 10 directs light to a common region so as to add the light collected from each area of the source to the limited region to be illuminated. One form of this collection would produce collimated light from each section of the light source, with each element producing a collimated beam parallel to, and overlapping the adjacent beams so as to form a continuous beam of light.

The holographic optical element (HOE) 10 permits an extended, diffuse light source 12 to be made highly directional, so as to maximize the percentage of light directed to a specific viewing area of interest. Normally, a diffuse source puts out uniform light in all directions.

However, such a diffuse source is very light inefficient when the light is primarily needed in one area or direction. A simple lens, particularly a low f-number lens for high light collection, cannot direct the light in such a controlled manner (as schematically depicted in FIGS. 2A and 2B). The HOE 10 makes the source 12 act as though it is a localized source, coming from a single point. A single point source can be made highly light efficient by using a lens to illuminate just the area of interest, without fully illuminating all areas equally.

In addition, by using thick film Bragg holograms ("Optical Holography", R. Collier, C. Burckhardt, L. Lin; Academic Press, 1971), it is possible to optimize the efficiency at one wavelength or over a wavelength band. In this manner the HOE 10 can be fabricated to allow the passage of only a selected region of the total spectrum of the light source, in effect acting as a color filter. A photopolymerizable composition may also be employed in fabricating the HOE as described in U.S. Pat. No. 4,588,664, assigned to Polaroid Corporation of Cambridge, Mass.

The HOE 10 of this invention has a plurality of specifically designed holographic optical elements designed to collect the light from the extended, diffuse light source 12 and redirect that light into a highly directional light beam. The effect is to efficiently collect a higher percentage of light from the source than is practical with conventional optical systems, and direct this light into a specific region of interest with a minimum spread of the light beam. This invention makes it practical to use an extended light source, such as a neon or fluorescent source in a light fixture configured as a task area light.

The holographic optical element (HOE) consists of an array of independent holographic lenses 11, each made to collect the light from a small portion of the light source in an efficient manner. This array may have overlapping elements, or elements made to collect light from specific regions of the source. Each HOE lens element 11 is made to collect light from a limited region and redirect all that light into a single near collimated or other highly directional light beam 20 with a predetermined direction or distribution to a viewing pattern. In total, the HOE array acts to create a highly directional light beam that appears as if the light was being collected from a very localized point source, such as an arc, laser, or other task area source, by a conventional collimating or condenser lens.

The HOE is formed by recording individual small holograms, each by a different exposure, made to collect light from a small, possibly semi-diffuse area as a reference beam, so as to reconstruct a specific highly directional beam such as a collimated beam directed at a specific angle to the hologram plane. Each lens element 11 of the HOE operates independent of each other, but in a complimentary manner to collect light from the entire surface of the extended light source, with each element collecting light from the next adjoining patch, and at the next range of angles or light not collected by the neighboring HOE element. This complimentary operation works to collect a majority of the light from the one side of the extended light source in a highly efficient manner.

As holograms are color sensitive, the HOE 10 can further be made to be specifically color selective, collecting light efficiently in one wavelength band, while separating out other possibly unwanted wavelengths. Color selection in this case requires only that at some distance, only the wavelength region or interest is predominant, while other wavelengths have been directed to a much different angle, or not collected at all by the HOE.

The benefit of this invention is that it permits high energy efficiency sources, such as neon, such as cold cathode neon, cold cathode fluorescent, hot cathode fluorescent, or solid state sources that are extended in nature to be used in applications where directional light is needed. The use of such sources has been limited by their highly diffuse and extended nature. Although such sources are more energy efficient than arc or incandescent lights, the light from these sources could not be directed in an efficient manner for illumination at any distance.

The structure described above would enable the light source and HOE to function in a light fixture configured as a task area light or as a lighting fixture configured for illuminating a selected area of a work space or room or in a vehicle light fixture.

Figure 4A:
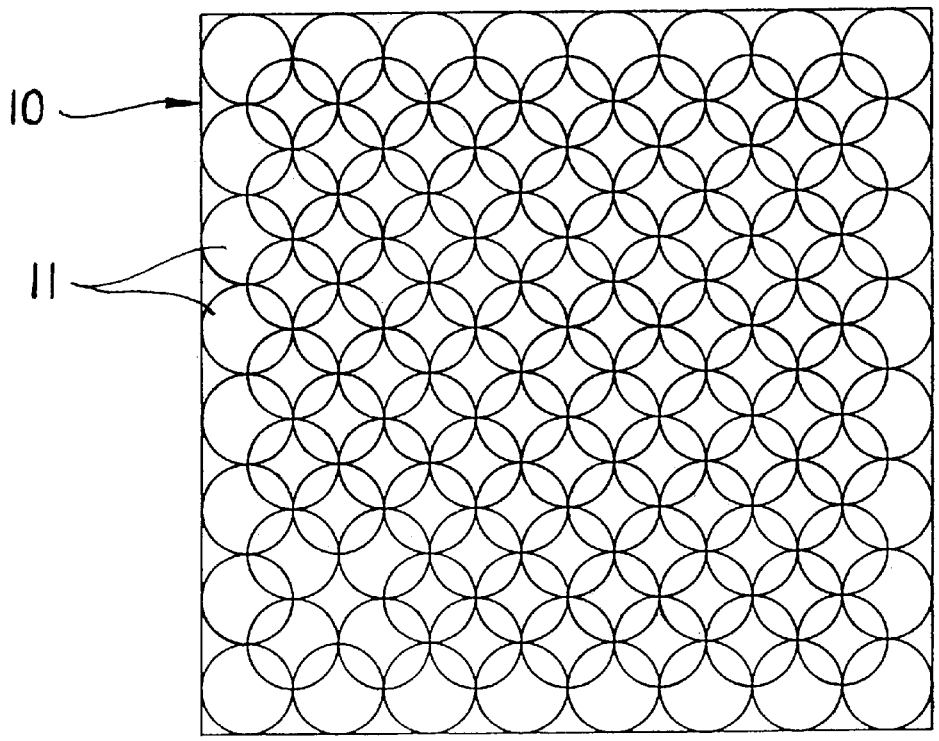
FIGS. 4A and 4B illustrate one alternative for constructing the holographic optical element (HOE)
Figure 4B:
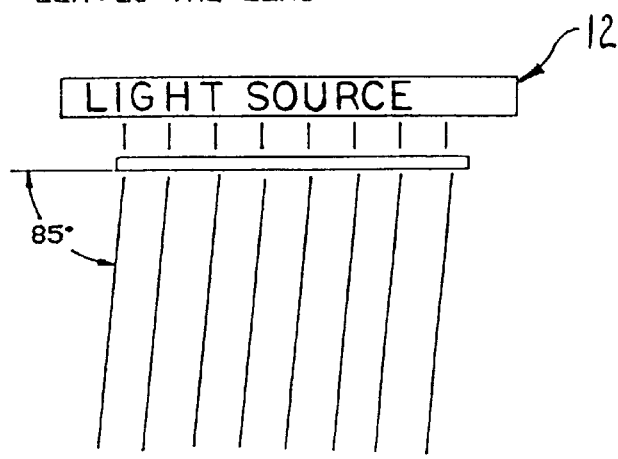

Another use of such a HOE 10 is in a traffic control signal fixture (see FIGS. 4A, 4B and 5) in which the light source is a highly efficient but diffuse flat plate neon discharge. By using a HOE 10 as described, the diffuse light from an extended light source panel 12 can be made directional such that industry regulations (such as "Vehicle Traffic Control Signal Heads" (VTCSH) 11.04, Table 1 and associated annotation and foreign equivalents thereof, reference to which is incorporated herein) with respect to light distribution can be met (FIG. 3). One possible mode of construction of plural HOE lens elements for use in this application is shown in FIGS. 4A and 4B. By using the polychromatic neon discharge, it is possible, by means of wavelength selective HOEs, to produce, for example, signal amber in the same traffic signal. Alternatively, conventional color filters can be utilized in the transparent cover assembly and as is well known in the art.

When the light of specific wavelength content is in the red, amber, or green region, it is to be directed by the HOE 10 so as to predominantly be concentrated within about a 30 degree region on opposite sides of a central vertical plane extending perpendicularly through the HOE plane, and about 0 to 20 degrees down from the horizon. For efficiency, a minimal amount of light 21 is left to go either above the horizon, or to the sides in excess of 45 degrees from the aforesaid central plane.

The light source may also be an array of LEDs or a flat thin-film transparent electroluminescent (EL) elements (see U.S. Pat. No. 4,857,920, reference to which is incorporated herein). The preferred embodiment, however, combines the HOE with a cold cathode neon or similar diffuse gas discharge light source to create a more energy efficient directional light for use as a traffic signal.

Figure 5:
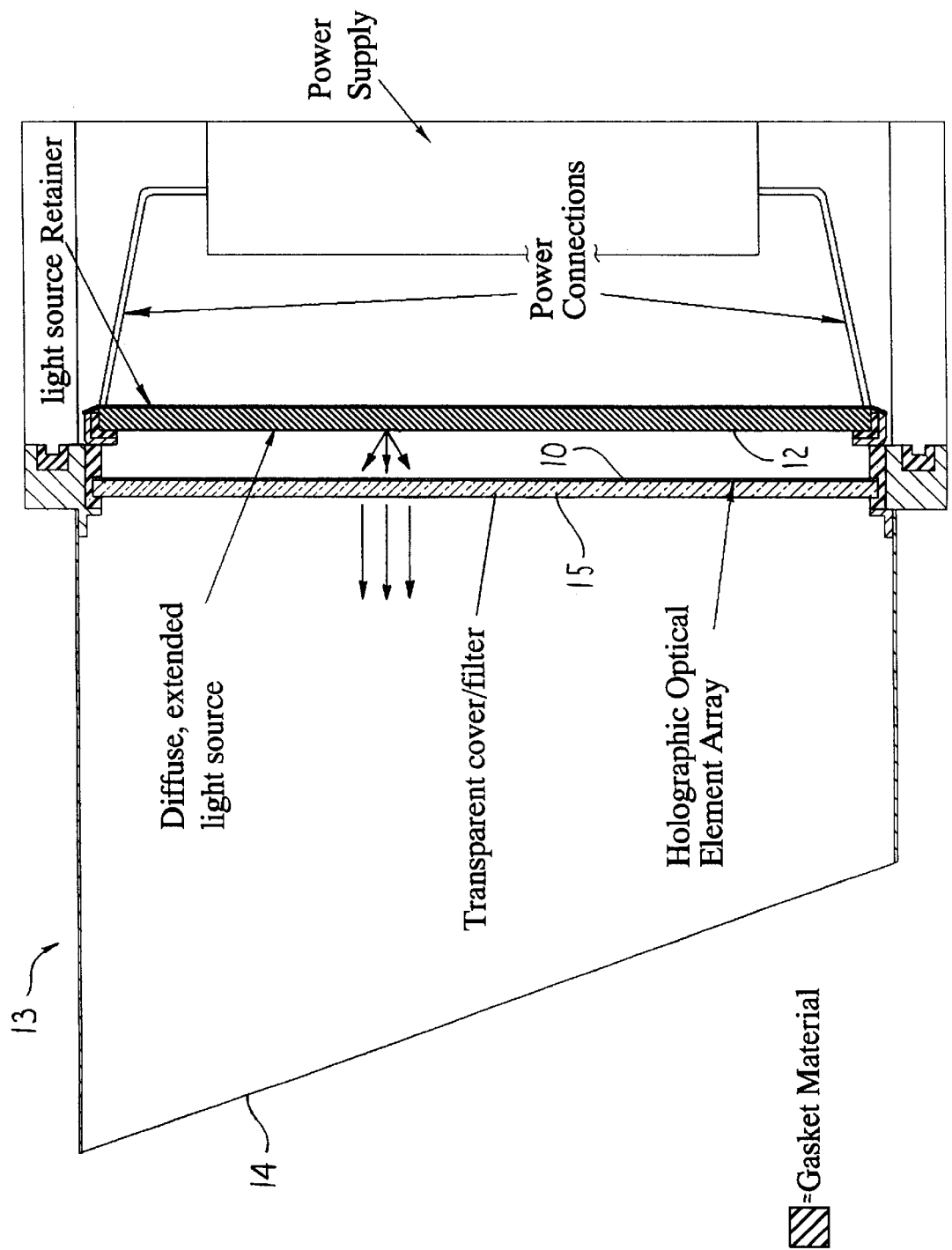
FIG. 5 is a central section through a generally conventional traffic light housing modified to incorporate therein the invention.

Referring to FIG. 5, a generally schematical outline of a traffic light housing 13 is illustrated, which housing includes a conventional shield 14. Further detailed description of the housing 13 is believed unnecessary in view of the conventional nature thereof. Nevertheless, the teachings of U.S. Pat. No. 5,010,336 is incorporated herein by reference.

As shown in FIG. 5, the conventional light bulb and reflector in U.S. Pat. No. 5,010,336 has been replaced by the extended and diffuse light source 12 which, in this embodiment, is in the form of a flat panel having therein a continuous and sealed off gas containing channel traversing a majority of the area of the panel. For example, the channel could be configured to traverse the panel in a spiral (see also U.S. Pat. No. 3,641,487) or an up-down zig-zag pattern. U.S. Pat. Nos. 3,641,487 and 4,584,501 are incorporated herein by reference.

As is also shown in FIG. 5, the lens in the cover in U.S. Pat. No. 5,010,336 (also in U.S. Pat. No. 3,641,487) has been replaced by a transparent lens 15 having adhesively or otherwise secured thereto, or embossed thereon, on a side thereof facing the light source 12, the HOE 10 embodying the invention. While the lens 15 is shown in FIG. 5 to be flat, the contour can be otherwise, such as concave or convex. If desired, the lens 15 can incorporate the desired red, amber or green filter or tint. The area of the lens 15 is generally equal to the area of the thin material (film) HOE 10.

The power supply in U.S. Pat. No. 5,010,336 will also need to be modified to a conventional source for accommodating the power requirements of the extended and diffuse light source 12, here the flat panel, cold cathode neon light source 12.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A traffic control light, comprising:
    a traffic light housing inside of which is provided a first support for a light source and a second support for a holographic optical element, said second support being spaced a finite distance from said first support;
    an extended and diffuse gas discharge light source mounted on said first support;
    a holographic optical element mounted on said second support in spaced relation to said light source, said holographic optical element comprising a layer of holograph adaptable material having formed thereon an array of independent holographic lenses each being directly responsive to selected regions on said light source for directing light collected from said selected regions on said light source to a selected viewing pattern, said viewing pattern being compatible with existing industrial specifications for traffic lights.

2. The traffic control light according to claim 1, wherein said selected regions on said light source are contiguous.

3. The traffic control light according to claim 1, wherein said selected regions on said light source are spaced from one another.

4. The traffic control light according to claim 1, wherein said selected regions on said light source are overlapping.

5. The traffic control light according to claim 1, wherein said second support is configured to support both a holographic optical element and a transparent cover, said holographic optical element being secured to a side of said transparent cover facing said light source.

6. The traffic control light according to claim 1, wherein said light source is free of a spaced reflector which collects light emanating from a side of said light source remote from said holographic optical element and redirects the collected light to said holographic optical element.

7. The traffic control light according to claim 1, wherein said light source is at least one of a flat panel cold cathode neon light and a flat panel cold or hot cathode fluorescent light, said holographic lenses are responsive to selected regions of said flat panel from which light emanates.

8. The traffic control light according to claim 1, wherein said light source is an elongated hot cathode fluorescent light source and said holographic lenses are responsive to selected regions along the length of said elongated fluorescent light.

9. The traffic control light according to claim 5, wherein said transparent cover is also a color filter or is tinted.

10. The traffic control light according to claim 1, wherein said light source and said holographic optical element have generally the same peripheral dimensions.

11. The traffic control light according to claim 1, wherein said second support is configured to support both a holographic optical element and a transparent cover, said holographic optical element being embossed on a side of said transparent cover facing said light source.

12. The traffic control light according to claim 11, wherein said transparent cover is also a color filter or is tinted.

13. The traffic control light according to claim 1, wherein said viewing pattern is concentrated within generally 30 degrees left to right of a vertical plane and generally 0 to 20 degrees down from a horizontal plane.

14. The traffic control light according to claim 1, wherein said light source and said holographic optical element are adapted to be a replacement for an existing incandescent light source and spaced reflector inside the traffic light housing.

15. The traffic control light according to claim 1, wherein each of said holographic lenses includes a construction that allows passage therethrough of only a selected wavelength or wavelength band of the total spectrum from said light source so as to direct said selected wavelength or wavelength band solely to said viewing pattern.

16. The traffic control light according to claim 1, wherein said light source is a flat panel and said holographic lenses are responsive to selected regions of said flat panel from which light emanates.

17. The traffic control light according to claim 1, wherein said traffic light housing includes a power supply support; and wherein said light source includes a power supply therefor mounted in said power supply support.

18. A light fixture, comprising:
    a light fixture housing inside of which is provided a first support for a light source, a second support for a holographic optical element and a third support for a power supply, said second support being spaced a finite distance from said first support;
    an electrical extended and diffuse gas discharge light source mounted on said first support;
    a holographic optical element mounted on said second support in spaced relation to said light source, said holographic optical element comprising a layer of holograph adaptable material having formed thereon an array of independent holographic lenses each being directly responsive to selected regions on said light source for directing light collected from said selected regions on said light source to a selected viewing pattern; and
    an electrical power supply mounted on said third support and electrically connected to said light source.

19. The light fixture according to claim 18, wherein said second support is configured to support both a holographic optical element and a transparent cover, said holographic optical element being secured to a side of said transparent cover facing said light source.

20. The light fixture according to claim 18, wherein said second support is configured to support both a holographic optical element and a transparent cover, said holographic optical element being embossed on a side of said transparent cover facing said light source.

21. The light fixture according to claim 18, wherein said selected regions on said light source are contiguous.

22. The light fixture according to claim 18, wherein said selected regions on said light source are spaced from one another.

23. The light fixture according to claim 18, wherein said selected regions on said light source are overlapping.

* * * * *